Patented Mar. 29, 1932

1,851,767

UNITED STATES PATENT OFFICE

MAX H. HUBACHER, OF NITRO, WEST VIRGINIA, ASSIGNOR TO THE RUBBER SERVICE LABORATORIES CO., OF AKRON, OHIO, A CORPORATION OF OHIO

PROCESS FOR THE VULCANIZATION OF RUBBER AND PRODUCT OBTAINED THEREBY

No Drawing.    Application filed October 14, 1929.    Serial No. 399,705.

The present invention relates to the vulcanization of rubber by an improved process wherein there is employed, in addition to an accelerator and the ordinary compounding ingredients, a class of reaction products capable of imparting age resisting or anti-oxidant properties to the vulcanized rubber product.

Broadly, the present invention relates to the use in a rubber compound of a reaction product of a halogen alkyl aryl ether and an arylamine as an anti-oxidant or age resisting compound whereby the period of use of the vulcanized rubber product with respect to aging and oxidation thereof is greatly increased. More particularly the present invention relates to the use of the reaction product of a chlorethyl aryl ether and a primary aromatic amine as an anti-oxidant.

As is well known to rubber chemists, the age resisting characteristics of a vulcanized rubber product can be readily ascertained by subjecting samples of a vulcanied product in a bomb to the action of oxygen under pressure and maintained for several hours at an elevated temperature. The samples so treated are then examined and tested and the results compared with similar results obtained by testing the unaged vulcanized stock. The deterioration in properties suffered as a result of the oxidation treatment is indicative of the result that would be normally expected from that particular stock during service. A test carried out in the manner described is known as the Bierer-Davis aging test and produces an effect on a vulcanied rubber stock comparable with that resulting from several years of natural aging of the rubber.

This invention will be readily understood from the following description and examples. One of the preferred types of compounds known as beta phenoxyethyl alpha naphthylamine was prepared by heating chlorethyl phenyl ether and alpha naphthylamine in the ratio of substantially one molecular proportion of the former to substantially two molecular proportions of the latter for several hours, preferably from eleven to sixteen hours, at a temperature of approximately 140 to 145° C. On completion of the reaction, the reaction product was washed first with hot dilute hydrochloric acid and then with hot water to remove any unreacted naphthylamine or naphthylamine hydrochloride formed as a by-product. This crude material after further purification, preferably by recrystallization from an organic solvent, for example ethyl alcohol, is a white solid melting at 102° to 102.6° C. (uncorrected) and is soluble in cold benol, chloroform, ether and hot glacial acetic acid. It is though the reaction involved in the preparation of beta phenoxyethyl alpha naphthylamine is as follows:

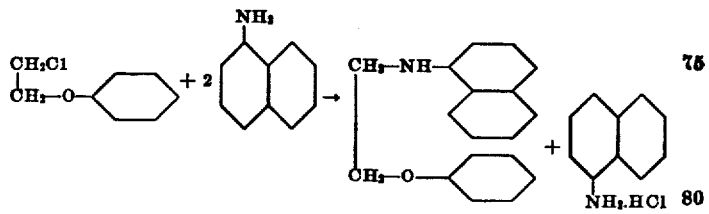

A sample of the product thus obtained was then incorporated in the well known manner in a rubber stock comprising 100 parts of smoked sheet rubber,
40 parts of carbon black,
10 parts of zinc oxide,
2 parts of a blended mineral oil and rosin,
3.25 parts of sulfur,
1.0 part of diphenyl guanidine,
1.0 part of beta phenoxyethyl alpha naphthylamine.

This stock was then vulcanized by heating sheets of the stock in the usual manner for different periods of time at the temperature given by forty pounds of steam pressure per square inch, that is 287° F. Portions of the stock cured as described were artificially aged by heating samples of the said rubber stock in an oxygen bomb for 18, 27 and 36 hours at 70° C. and under an oxygen pressure of 300 pounds per square inch. The results obtained by testing the aged and unaged stocks are given in Table I.

Table I

| Time of cure | Hours aged | Modulus of elasticity in lbs/in² at elongations of— | | Tensile at break in lbs/in² | Ultimate elongation |
|---|---|---|---|---|---|
| | | 300% | 500% | | |
| 30 mins. at 287°F | 0 | 672 | 1,895 | 2,935 | 650 |
| Do | 18 | 783 | 1,855 | 2,179 | 555 |
| Do | 27 | 847 | 1,943 | 2,258 | 560 |
| Do | 36 | 772 | | 1,663 | 490 |
| 45 mins. at 287°F | 0 | 1,060 | 2,625 | 3,465 | 610 |
| Do | 18 | 1,073 | 2,405 | 3,105 | 610 |
| Do | 27 | 1,025 | 2,258 | 2,735 | 585 |
| Do | 36 | 940 | 2,055 | 2,113 | 505 |
| 60 mins. at 287°F | 0 | 1,195 | 2,905 | 4,035 | 635 |
| Do | 18 | 1,240 | 2,595 | 3,190 | 595 |
| Do | 27 | 1,163 | 2,390 | 2,788 | 565 |
| Do | 36 | 1,065 | 2,193 | 2,213 | 505 |

The results as set forth in Table I show that the reaction product of chlorethyl phenyl ether and alpha naphthylamine, prepared as described, is an important anti-oxidant. The rubber stock in which the product set forth was employed as an anti-oxidant retained to a great extent its original characteristics even after heating for 36 hours at 70° C. and under an oxygen pressure of 300 pounds per square inch.

Another of the preferred class of compounds comprises the product formed by heating chlorethyl phenyl ether and beta naphthylamine, in the ratio of substantially one molecular proportion of the former to substantially two molecular proportions of the latter, for substantially four hours at a temperature of approximately 140 to 145° C. When combination of the materials had apparently ceased, any unreacted chlorethyl phenyl ether was removed by steam distillation. Any unreacted beta naphthylamine and the beta naphthylamine hydrochloride formed as a by product was removed by washing the residue remaining after the steam distillation with hot dilute hydrochloric acid and finally with hot water. The crude product thus obtained was an oil which solidified at room temperature. On purifying the crude product, preferably by recrystallizing from an organic solvent, for example ethyl alcohol, a solid was obtained having an uncorrected melting point of 98 to 98.4° C.

It is believed the reaction involved in the preparation of this material according to the manner described is as follows:

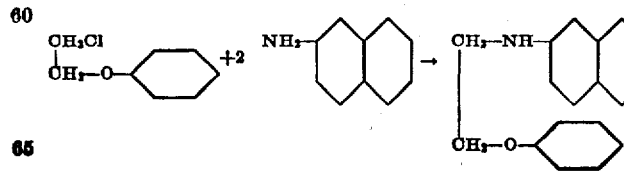

A sample of this material prepared as described was then incorporated in the usual manner in a rubber stock comprising 100 parts of pale crepe rubber,
40 parts of carbon black,
10 parts of zinc oxide,
2 parts of a blended mineral oil and rosin,
3.25 parts of sulfur,
1 part of diphenyl-guanidine,
1 part of beta phenoxyethyl beta naphthylamine.

The stock was then cured by heating sheets of the stock for different periods of time at the temperature given by forty pounds steam pressure per square inch. Samples of the rubber stock cured as described were then artificially aged by heating in an oxygen bomb for thirty hours at 70° C. and under an oxygen pressure of 300 pounds per square inch. The results obtained by testing the unaged and aged stocks are given in Table II.

Table II

| Time of cure | Hours aged | Modulus of elasticity in lbs/in² at elongations of— | | Tensile at break in lbs/in² | Ultimate elongation |
|---|---|---|---|---|---|
| | | 300% | 500% | | |
| 30 mins. at 287°F | 0 | 815 | 2,160 | 3,320 | 630 |
| Do | 30 | 816 | 2,070 | 2,590 | 580 |
| 60 mins. at 287°F | 0 | 1,280 | 3,145 | 4,190 | 610 |
| Do | 30 | 1,270 | 2,775 | 3,270 | 590 |

The data set forth in Table II show that beta phenoxyethyl beta naphthylamine possesses desirable anti-oxidant properties.

Another of the preferred class of compounds comprises beta phenoxyethyl aniline prepared by heating substantially one molecular proportion of chlorethyl phenyl ether and substantially two molecular proportions of aniline for substantially two to four hours at approximately 140 to 150° C. Any unreacted aniline present or aniline hydrochloride formed was eliminated by washing with hydrochloric acid. The crude product on purifying, preferably by steam distillation, melted at 49.0° C. (uncorrected), and was soluble in alcohol and benzene.

It is believed the reaction involved in the preparation of this compound by the method described is as follows:

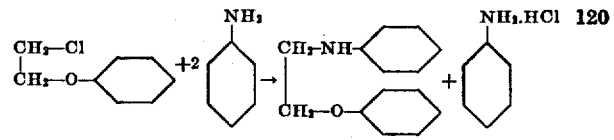

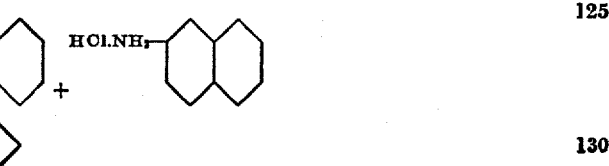

A sample of this material was compounded in a rubber stock comprising 100 parts of smoked sheet rubber,
40 parts of carbon black,
10 parts of zinc oxide,
2 parts of a blended mineral oil and rosin,
3.25 parts of sulfur.
1 part of diphenyl-guanidine,
1 part of beta phenoxyethyl aniline.

After vulcanizing by heating in a press for different periods of time under forty pounds of steam pressure per square inch, portions of the stock were aged in the manner previously set forth by heating in an oxygen bomb for thirty hours at 70° C. and under a pressure of 300 pounds of oxygen per square inch. The tensile data obtained on testing the aged and unaged stocks are given in Table III.

Table III

| Time of cure | Hours aged | Modulus of elasticity in lbs/in² at elongations of— | | Tensile at break in lbs/in² | Ultimate elongation |
|---|---|---|---|---|---|
| | | 300% | 500% | | |
| 30 mins. at 287° F | 0 | 723 | 2,010 | 2,730 | 600 |
| Do | 30 | 648 | | 1,295 | 460 |
| 60 mins. at 287° F | 0 | 1,225 | 2,965 | 3,935 | 605 |
| Do | 30 | 1,028 | 2,120 | 2,120 | 500 |
| 0 mins. at 287° F | 0 | 1,320 | 3,205 | 4,245 | 610 |
| Do | 30 | 1,130 | | 2,010 | 455 |

The above results show that beta phenoxy ethyl aniline possesses anti-oxidant properties since a stock similar in all respects to that tested except that no anti-oxidant was used, melts down completely in the oxidation test described.

Another of the preferred class of antioxidants is beta naphthoxy ethyl beta naphthylamine. This material was prepared from chlorethyl beta naphthyl ether and beta naphthylamine in a manner analogous to that by which beta phenoxy ethyl alpha naphthylamine was produced. The product is a solid melting at 164° C.

A sample of this material was incorporated in a rubber stock comprising 100 parts of smoked sheet rubber,
40 parts of carbon black,
10 parts of zinc oxide,
2 parts of a blended mineral oil and rosin,
3.25 parts of sulfur,
1.0 part of diphenyl-guanidine,
1.0 part of beta naphthoxy ethyl beta naphthylamine.

On curing the rubber stock and aging samples of the vulcanized product by heating in an oxygen bomb for 36 hours at 70° C. under an oxygen pressure of 300 pounds of oxygen per square inch, a rubber product was obtained which on testing was found to possess the following characteristics:

Table IV

| Time of cure | Hours aged | Modulus of elasticity in lbs/in² at elongations of— | | Tensile at break in lbs/in² | % ultimate elongation |
|---|---|---|---|---|---|
| | | 300% | 500% | | |
| 30 mins. at 287° F | 0 | 838 | 2,225 | 3,035 | 615 |
| Do | 36 | 631 | 1,420 | 1,235 | 465 |
| 60 mins at 287° F | 0 | 1,240 | 3,015 | 4,645 | 650 |
| Do | 36 | 1,050 | 2,013 | 2,013 | 500 |

The data as disclosed in Table IV show that the reaction product of beta naphthylamine and chlorethyl beta naphthyl ether possesses desirable antioxidant properties.

Another of the preferred class of compounds is formed by heating chlorethyl phenyl ether and benzidine in the ratio of substantially one molecular proportion of chlorethyl phenyl ether and substantially two molecular proportions of benzidine, for substantially one-half an hour at approximately 140–145° C. In order to eliminate any unreacted benzidine or by-products formed, the reaction product was thoroughly washed with hot aqueous hydrochloric acid. The undissolved residue comprising the desired product was then purified, preferably by recrystallization from an organic solvent, for example ethyl alcohol. The product thus obtained was a solid in the form of small needles which melted at 172.6 to 173.4° C. (uncorrected). This material was incorporated in a pure gum stock comprising 100 parts of pale crepe rubber,
5 parts of zinc oxide,
3.5 parts of sulfur,
0.8 part of diphenyl-guanidine,
1.0 part of anti-oxidant.

The compounded rubber stock was then cured in the usual manner and samples of the vulcanized rubber product were then aged by heating in an oxygen bomb for 48 hours at 70° C. under an oxygen pressure of 300 pounds per square inch. The data obtained on testing the aged and unaged cured rubber product is given in Table V.

Table V

| Time of cure | Hours aged | Modulus of elasticity in lbs/in² at elongations of— | | | Tensile at break in lbs/in² | % Ultimate elongation |
|---|---|---|---|---|---|---|
| | | 300% | 500% | 700% | | |
| 15 mins. at 287° F | 0 | 82 | 167 | 844 | 2,363 | 875 |
| Do | 48 | 54 | 167 | 543 | 1,463 | 865 |
| 30 mins. at 287° F | 0 | 133 | 491 | 1,830 | 3,238 | 805 |
| Do | 48 | 86 | 331 | 1,388 | 1,825 | 765 |
| 45 mins. at 287° F | 0 | 192 | 773 | 2,733 | 3,475 | 753 |
| Do | 48 | 152 | 625 | | 1,935 | 685 |

The reaction product of chlorethyl phenoxy ether and p-toluidine has been prepared in a manner analogous to that by which beta phenoxy ethyl beta naphthylamine, hereinbefore described, was prepared. This material on artificially aging in the manner previously described was found to possess desirable anti-oxidant properties.

From the data hereinbefore set forth it is readily apparent that the preferred class of materials constitute an important class of anti-oxidants which function satisfactorily and exhibit very desirable characteristics in either a pure gum or tread stock.

Other examples of the preferred class of materials than those set forth above may be employed as anti-oxidants. Thus, I may employ the aniline, xylidene, toluidine, benzidene and analogous aryl amino derivatives of chlor-propyl, chlorbutyl phenyl, naphthyl and the like ethers as anti-oxidants.

In all of the examples hereinbefore cited, diphenyl-guanidine was employed as the accelerator since it is known to produce a vulcanized rubber stock possessing exceptionally poor aging qualities and consequently does not mask the effect of the anti-oxidant. Other accelerators could, of course, have been employed with possibly different tensile figures resulting, but all showing the desirable anti-oxidant properties of the preferred class of compounds.

The various examples hereinbefore set forth in detail are to be understood as illustrative only and not at all limitative of the scope of the invention. This invention is limited solely by the claims attached hereto as a part of this specification.

What is claimed is:

1. The process of manufacturing an age resisting vulcanized rubber product which comprises curing a rubber composition of vulcanization characteristics in the presence of an anti-oxidant comprising a reaction product of a halogen alkyl aryl ether and an arylamine.

2. The process of manufacturing an age resisting vulcanized rubber product which comprises curing a rubber composition of vulcanization characteristics in the presence of an anti-oxidant comprising a reaction product of a halogen alkyl aryl ether and a primary aromatic amine.

3. The process of manufacturing an age resisting vulcanized rubber product which comprises curing a rubber composition of vulcanization characteristics in the presence of an anti-oxidant comprising a reaction product of a halogen ethyl aryl ether and a primary aromatic amine.

4. The process of manufacturing an age resisting vulcanized rubber product which comprises curing a rubber composition of vulcanization characteristics in the presence of an anti-oxidant comprising a reaction product of chlorethyl phenyl ether and a primary aromatic amine.

5. The process of manufacturing an age resisting vulcanized rubber product which comprises curing a rubber composition of vulcanization characteristics in the presence of an anti-oxidant comprising beta phenoxyethyl beta naphthylamine.

6. The process of manufacturing an age resisting vulcanized rubber product which comprises curing a rubber composition of vulcanization characteristics in the presence of an anti-oxidant comprising a reaction product of a chlor alkyl aryl ether wherein said alkyl group contains less than five carbon atoms and an arylamine.

7. The process of manufacturing an age resisting vulcanized rubber product which comprises curing a rubber composition of vulcanization characteristics in the presence of an anti-oxidant comprising an aryloxy ethyl aromatic amine compound.

8. The process of manufacturing an age resisting vulcanized rubber product which comprises curing a rubber composition of vulcanization characteristics in the presence of an anti-oxidant comprising an aryloxy ethyl secondary aromatic amine compound.

9. The process of manufacturing an age resisting vulcanized rubber product which comprises curing a rubber composition of vulcanization characteristics in the presence of an anti-oxidant comprising a phenoxy ethyl secondary aromatic amine compound.

10. A vulcanized rubber product possessing age resisting characteristics comprising the vulcanization product of a rubber stock containing prior to the vulcanization of said stock an anti-oxidant comprising a reaction product of a halogen alkyl aryl ether and an arylamine.

11. A vulcanized rubber product possessing age resisting characteristics comprising the vulcanization product of a rubber stock containing prior to the vulcanization of said stock an anti-oxidant comprising a reaction product of a halogen alkyl aryl ether and a primary aromatic amine.

12. A vulcanized rubber product possessing age resisting characteristics comprising the vulcanization product of a rubber stock containing prior to the vulcanization of said stock an anti-oxidant comprising a reaction product of a halogen ethyl aryl ether and a primary aromatic amine.

13. A vulcanized rubber product possessing age resisting characteristics comprising the vulcanization product of a rubber stock containing prior to the vulcanization of said stock an anti-oxidant comprising a reaction product of chlor ethyl phenyl ether and a primary aromatic amine.

14. A vulcanized rubber product possessing age resisting characteristics comprising the vulcanization product of a rubber stock containing prior to the vulcanization of said stock an anti-oxidant comprising beta phenoxyethyl beta naphthylamine.

15. A vulcanized rubber product possessing age resisting characteristics comprising the vulcanization product of a rubber stock containing prior to the vulcanization of said stock an anti-oxidant comprising a reaction product of a chlor alkyl aryl ether wherein said alkyl group contains less than five carbon atoms and an arylamine.

16. A vulcanized rubber product possessing age resisting characteristics comprising the vulcanization product of a rubber stock containing prior to the vulcanization of said stock an anti-oxidant comprising an aryloxy ethyl aromatic amine compound.

17. A vulcanized rubber product possessing age resisting characteristics comprising the vulcanization product of a rubber stock containing prior to the vulcanization of said stock an anti-oxidant comprising a reaction ethyl secondary aromatic amine compound.

18. A vulcanized rubber product possessing age resisting characteristics comprising the vulcanization product of a rubber stock containing prior to the vulcanization of said stock an anti-oxidant comprising a phenoxy ethyl secondary aromatic amine compound.

In testimony whereof I hereunto affix my signature.

MAX H. HUBACHER.

CERTIFICATE OF CORRECTION.

Patent No. 1,851,767.   Granted March 29, 1932, to

MAX H. HUBACHER.

It is hereby certified that error appears in the printed specification of the above numbered patent requiring correction as follows: Page 1, line 68, for the misspelled word "benol" read benzol; page 5, line 18, claim 17, for "a reaction" read an aryloxy; and that the said Letters Patent should be read with these corrections therein that the same may conform to the record of the case in the Patent Office.

Signed and sealed this 3rd day of May, A. D. 1932.

(Seal)

M. J. Moore,
Acting Commissioner of Patents.

ing age resisting characteristics comprising the vulcanization product of a rubber stock containing prior to the vulcanization of said stock an anti-oxidant comprising a reaction product of a chlor alkyl aryl ether wherein said alkyl group contains less than five carbon atoms and an arylamine.

16. A vulcanized rubber product possessing age resisting characteristics comprising the vulcanization product of a rubber stock containing prior to the vulcanization of said stock an anti-oxidant comprising an aryloxy ethyl aromatic amine compound.

17. A vulcanized rubber product possessing age resisting characteristics comprising the vulcanization product of a rubber stock containing prior to the vulcanization of said stock an anti-oxidant comprising a reaction ethyl secondary aromatic amine compound.

18. A vulcanized rubber product possessing age resisting characteristics comprising the vulcanization product of a rubber stock containing prior to the vulcanization of said stock an anti-oxidant comprising a phenoxy ethyl secondary aromatic amine compound.

In testimony whereof I hereunto affix my signature.

MAX H. HUBACHER.

CERTIFICATE OF CORRECTION.

Patent No. 1,851,767.  Granted March 29, 1932, to

MAX H. HUBACHER.

It is hereby certified that error appears in the printed specification of the above numbered patent requiring correction as follows: Page 1, line 68, for the misspelled word "benol" read benzol; page 5, line 18, claim 17, for "a reaction" read an aryloxy; and that the said Letters Patent should be read with these corrections therein that the same may conform to the record of the case in the Patent Office.

Signed and sealed this 3rd day of May, A. D. 1932.

(Seal)

M. J. Moore,
Acting Commissioner of Patents.

CERTIFICATE OF CORRECTION.

Patent No. 1,851,767.    Granted March 29, 1932, to

MAX H. HUBACHER.

It is hereby certified that error appears in the printed specification of the above numbered patent requiring correction as follows: Page 1, line 68, for the misspelled word "benol" read benzol; page 5, line 18, claim 17, for "a reaction" read an aryloxy; and that the said Letters Patent should be read with these corrections therein that the same may conform to the record of the case in the Patent Office.

Signed and sealed this 3rd day of May, A. D. 1932.

M. J. Moore,
(Seal)    Acting Commissioner of Patents.